United States Patent

[11] 3,548,092

| [72] | Inventor | Toshihiko Takagi<br>Tokyo, Japan |
|---|---|---|
| [21] | Appl. No. | 653,907 |
| [22] | Filed | July 17, 1967 |
| [45] | Patented | Dec. 15, 1970 |
| [73] | Assignee | Nippon Columbia Company, Limited<br>Tokyo, Japan<br>a corporation of Japan |
| [32] | Priority | July 19, 1966 |
| [33] | | Japan |
| [31] | | Nos. 41/47211, 41/47212, 41/47213 and 41/47214 |

[54] COLOR VIDEO SIGNAL GENERATING SYSTEM
10 Claims, 16 Drawing Figs.

| [52] | U.S. Cl. | 178/5.4 |
|---|---|---|
| [51] | Int. Cl. | H04n 9/06 |
| [50] | Field of Search | 178/5.4, 5.4STC |

[56] References Cited
UNITED STATES PATENTS

| 2,907,817 | 10/1959 | Teer | 178/5.4(STC) |
|---|---|---|---|
| 3,001,012 | 9/1961 | Braicks | 178/5.4(STC) |
| 3,291,901 | 12/1966 | Takagi et al. | 178/5.4(STC) |
| 3,300,580 | 1/1967 | Takagi et al. | 178/5.4(STC) |
| 3,378,633 | 4/1968 | Macovski | 178/5.4(STC) |

*Primary Examiner*—Richard Murray
*Attorney*—Hill, Sherman, Meroni, Gross & Simpson ABSTRACT: A system for producing primary color signals through the use of a single one-gun video camera. An optical filter is disposed in an optical path for the camera or for a photographic film or sheet which is to be projected by the camera. The optical filter has alternate first, second and third filter strips. The first strip passes all the light, the second strip interrupts only red light and the third strip interrupts only blue light. The photographic film or sheet is prepared by forming an image on a monochrome photographic film with the aid of a set optical filter and developing the film. The video signals produced by the camera are supplied to integrating circuits controlled by gate circuits for producing continuous color signals corresponding to the three filter elements. These continuous signals are then matrixed to derive red, green and blue primary signals.

INVENTOR.
Toshihiko Takagi

INVENTOR.
Toshihiko Takagi
BY

COLOR VIDEO SIGNAL GENERATING SYSTEM

BACKGROUND OF INVENTION

This invention relates to a color video signal generating system for producing, for example, three primary-color signals such as red, blue and green through the use of a single one-gun video camera.

In the prior art have already been proposed systems adapted for producing primary-color video signals such as red, blue and green through the use of a single one-gun video camera. Such prior systems use a first filter consisting of an alternate successive arrangement of strip filter elements capable of passing therethrough substantially all the color lights from an object to be optically picked up and strip filter elements capable of interrupting, for example, only the red light, and a second filter consisting an alternate successive arrangement of strip filter elements capable of passing therethrough substantially all the color lights from said object to be optically picked up and strip filter elements capable of interrupting, for example, only the blue light, wherein said first and second filters, which are different in pitch from each other, are superimposed upon each other and disposed in the light transmission path for the video camera. Thus there is produced a signal which is a mixture of a first carrier frequency component corresponding to the pitch of the first filter's strip filter elements and a second carrier frequency component corresponding to the pitch of the second filter's strip filter elements. From thus produced signal are separated the first and second carrier frequency components, which are in turn demodulated so as to produce three primary-color signals.

A primary object of this invention is directed to improvements in the aforementioned prior systems.

It is an object of this invention to provide a video signal generating system comprising an optical filter consisting of an alternate successive arrangement of first strip filter elements capable of passing therethrough substantially all the color light from an object to be optically picked up, second strip filter elements capable of substantially interrupting or passing therethrough only one color light from said object, and third strip filter elements capable of substantially interrupting or passing therethrough a different color light from that which said second filter elements can interrupt or pass therethrough, wherein: (1) said optical filter is interposed in the light transmission path for a video camera to pick up the object, or (2) the image of the object is optically projected through said optical filter onto a monochrome photographic film by photographic means and then the photographic image developed on said film is picked up by means of the video camera, thereby producing three primary-color signals from a signal provided by said video camera in the manner as described in the above item (1 or (2).

Another object of this invention is to provide a color video signal generating system which can produce primary-color video signals with a high resolution through the use of a color signal having a wide frequency band width corresponding to a color light image.

Such system uses an optical filter consisting of an alternate successive arrangement of first strip filter elements capable of passing therethrough substantially all the color lights from an object to be picked up, second strip filter elements capable of substantially interrupting only one color light from said object and third strip filter elements capable of substantially interrupting a different color light from that which can be interrupted by said second filter elements, wherein said optical filter is interposed in the light transmission path for a video camera. In this system, as mentioned above, the first strip filter elements are adapted to pass all color lights therethrough, whereas the second strip filter elements are adapted to interrupt, for example, red light so as to enable green and blue lights to pass therethrough and the third strip filter elements are adapted to interrupt, for example, blue light so as to enable green and red lights to pass therethrough. Thus, the green light can pass through all the first, second and third strip filter elements, so that the green light image may be projected onto the conversion layer of the video camera without being interrupted. In this way, the output signal of the video camera always contains a green video signal corresponding to the green light image. This green video signal has a wide frequency band width which can be effectively utilized for providing a high resolution.

A further object of this invention is to provide a color video signal generating system using a single one-gun video camera tube and an optical striped filter having no index strip filter elements, wherein index signals can positively be produced even in the case where the color light from an object is only one color light. The optical striped filter to be used in this system consists of an alternate successive arrangement of first strip filter elements capable of passing therethrough substantially all the color lights from an object to be picked up, second strip filter elements capable of substantially interrupting or passing therethrough only one color light from said object, and third strip filter elements capable of substantially interrupting or passing therethrough a different color light from that which said second strip filter elements can interrupt or pass therethrough, said optical striped filter being interposed in the light transmission path for a video camera tube. In this system, the optical filter is so arranged that the extending direction of the strip filter elements thereof crosses the electron beam scanning direction of said video camera tube normally at a right angle thereto. Thus, there is produced a continuous video signal $E_C$ having a cyclic period $T_0$ corresponding to the pitch defined by the first, second and third filter elements. Within such cyclic period $T_0$, there appear an output which is the sum of outputs $E_R$, $E_G$ and $E_B$ representing the red, green and blue signals during a term $T_W$ corresponding to the width $D_W$ of the first strip filter elements (in this case, it is assumed that the second strip filter elements interrupt the red light, and that the third strip filter elements interrupt the blue light), an output which is the sum of the outputs $E_B$ and $E_G$ during a term $T_R$ corresponding to the width $W_R$ of the second strip filter elements, and an output which is the sum of the outputs $E_R$ and $E_G$ during the term $T_B$ corresponding to the width $W_B$ of the third strip filter elements. Thus, the resulting video signal $E_C$ is delivered to at least two integrating circuits through at least two sampling gate circuits which pass therethrough said video signal during the terms $T_R$ and $T_B$ and the outputs of the integrating circuits are delivered to a matrix circuit together with the video signal $E_C$, so that red, green and blue primary-color signals are derived from the matrix circuit.

In the case where there are provided three integrating circuits and three sampling gate circuits, only the outputs of the integrating circuits are delivered to the matrix circuit. In the above case, however, it is required that index signals be produced for the purpose of rendering the sampling gate circuits operative. Such index signals should appear at every cyclic period $T_0$ and be free from dropout. In order to obtain such index signals, it may be a conceivable practice to provide index strip filter elements which are adapted to interrupt any light. However, provision of such index strip filter elements reduces by the quantity corresponding to their entire area the light from the object which can be effectively utilized. Furthermore, the presence of such index strip filter elements causes beat frequencies to occur. In view of the fact the the amplitude of the video signal $E_C$ during the term $T_W$ corresponding to the width of the first strip filter elements is greater than those during the other terms $T_R$ and $T_B$, the present invention intends to produce such index signals by virtue of the difference in amplitude between the term $T_W$ and the terms $T_R$ and $T_B$. In this case, it is to be noted that the optical filter is so constructed that the output amplitude during the term $T_W$ becomes greater than the other terms even if the color light from the object is only one color light during the cyclic period $T_0$, thereby preventing the index signals from being dropped out.

It is still further object of this invention to provide a color video signal generating system wherein limitation is imposed upon a color light such that the maximum frequency of the video signal related to the light becomes lower than the fundamental frequency corresponding to the pitch of the optical filter, and use is made of a single one-gun video camera tube to produce color video signals. The optical filter to be employed in this system consists of an alternate successive arrangement of first strip filter elements capable of passing therethrough substantially all the color lights from an object to be picked up, second strip filter elements capable of substantially interrupting or passing therethrough only one color light from said object, and third strip filter elements capable of substantially interrupting or passing therethrough a different color light from that which said second strip filter elements can interrupt or pass therethrough, and this optical filter is interposed in the light transmission path for the video camera tube. In this system, it is possible that the second strip filter elements interrupt or pass therethrough a red light and the third strip filter elements interrupt or pass therethrough a blue light. In this case, a green light is projected on the photoelectric conversion layer of the video camera tube over the entire area thereof since it passes through all the strip filter elements. On the other hand, red and blue lights are intermittently projected onto such conversion layer, with the result that the fundamental frequency component corresponding to the pitch of the optical filter will be produced. In the case of a red or green scene of object which provides a frequency equal to or in the neighborhood of the aforementioned frequency component, there will occur the so-called Moire phenomenon. The system according to this object of this invention can prevent such phenomenon by imposing the aforementioned limitation upon a color light.

Other objects, features and advantages of this invention will become apparent from the following description taken in conjunction with the accompanying drawings.

DESCRIPTION OF PREFERRED EMBODIMENTS

Figure 1:
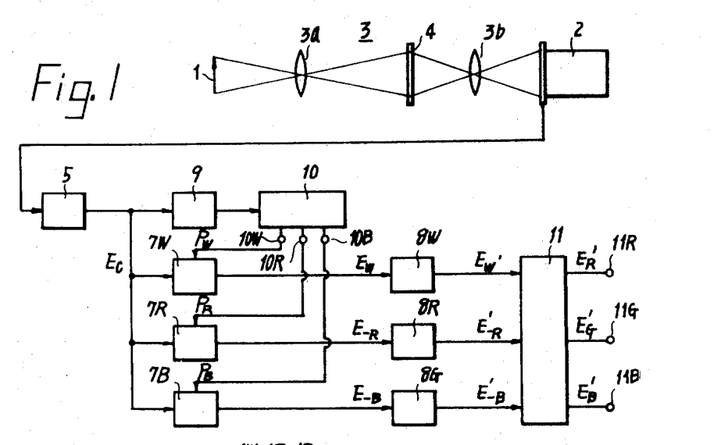
FIG. 1 is a schematic block diagram showing a basic example of the system according to this invention.

Referring now to FIG. 1, the reference numeral 1 denotes an object to be optically picked up, 2 a video camera or pickup tube such as image orthicon, vidicon or the like, and 3 an optical system provided in front of the camera tube 2. In accordance with an embodiment of this invention, the optical system includes an optical filter 4, which will be described in detail hereinafter, an objective lens 3a provided in front of the optical filter 4 and a relay lens 3b provided at the back of said filter. Thus the object 1 is projected onto the optical filter 4 through the objective lens 3a so that its image is formed on the filter, and the image thus formed is in turn projected onto the photoelectric conversion layer of the camera tube 2 through the relay lens 3b.

Figure 2:
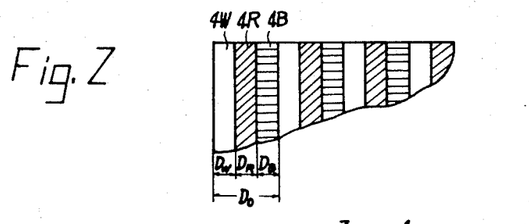
FIG. 2 is a fragmentary enlarged view of an example of the optical filter applicable to the system of this invention.

As illustrated in FIG. 2, the optical filter 4 consists of an alternate successive arrangement of strip filter elements 4W capable of passing therethrough substantially all the color lights from the object, strip filter elements 4R capable of substantially interrupting one color light such as, for example, red light, and strip filter elements 4B capable of substantially interrupting a different color light such as, for example, blue light. The widths $D_W$, $D_R$ and $D_B$ of the respective strip filter elements 4W, 4R and 4B may be selected so that they are equal to each other or different from each other or so that any two of them are equal to each other and the remaining one is different from the two. For convenience of illustration, however, description will be herein made of the case where the respective strip filter elements have equal widths. It is designed such that one pitch $D_0$ equal to the total width of the adjacent elements 4W, 4R and 4B corresponds to the horizontal width of a color picture element.

Figure 3:
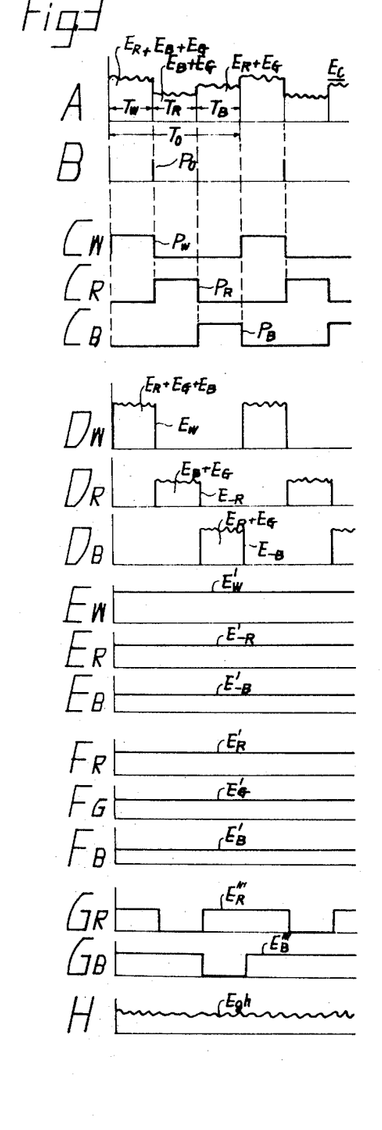
FIG. 3 is a waveform diagram for illustrating the example of the system according to this invention.

The optical filter 4 is provided in such a manner that the direction of extension of the filter elements thereof crosses the direction of an electron beam scanning on the photoelectric conversion layer of the camera tube. In general, the filter elements are arranged so that the direction of their extension crosses the scanning direction of an electron beam substantially at a right angle thereto, but these filter elements may be made slightly oblique with respect to the electron beam scanning direction so as to slightly change the apparent pitch of the arrangement of the filter elements. By supplying the output of the camera tube 2 to an amplifier 5 as shown in FIG. 1, a video signal $E_C$ can be produced at the output of the amplifier 5, as illustrated in FIG. 3A. As will be seen from this FIG., the video signal $E_C$ has a cyclic period $T_0$ corresponding to one pitch $D_0$ defined by the adjacent elements 4W, 4R and 4B and at every such cyclic period it consists of the sum amplitude of the outputs $E_R$, $E_G$ and $E_B$ respectively corresponding to the color lights R, G and B for a term $T_W$ corresponding to the width $D_W$ of the element 4W, the sum amplitude of the outputs $E_B$ and $E_G$ for a term $T_R$ corresponding to the width $D_R$ of the element 4R, and the sum amplitude of the outputs $E_R$ and $E_G$ for a term $T_B$ corresponding to the width $D_B$ of the element 4B. In the case of FIG. 3A, it is assumed that each of color lights R, G and B in one pitch has an equal energy.

As will be noted from the video signal $E_C$ as shown in FIG. 3A, the color light G passes through all the filter elements of the optical filter so that the output $E_G$ is produced which contains a higher frequency component than the fundamental frequency $f_0$ defined by the cyclic period $T_0$ corresponding to one pitch of the optical filter 4. This constitutes one of the advantages of this invention.

The color video signal $E_C$ as shown in FIG. 3A which is produced at the output of the amplifier 5 will be supplied to the system which will be presently described in conjunction with FIG. 1, thus producing three primary-color signals.

The video signal $E_C$ is supplied to integrating circuits 8W, 8R and 8B through gate circuits 7W, 7R and 7B, and simultaneously part of it is applied to an index signal generating circuit 9. By way of example, the circuit 9 may be constructed so as to discriminate the term $T_W$ in view of the fact that the amplitude level for $T_W$ exceeds those for $T_R$ and $T_R$ in every cyclic period of the video signal $E_C$ as shown in FIG. 3A. Detailed explanation of such circuit arrangement will be omitted since it can be readily achieved by any well-known amplitude comparator or discriminator means. In any event, it is designed such that a pulse $P_0$ is produced, for example, at the terminating end of the term $T_W$ (the starting end of the term $T_R$) within each cyclic period $T_0$, as shown in FIG. 3B. Thus produced pulse $P_0$ is applied to a gate signal generating circuit 10, so that three gate signals $P_W$, $P_R$ and $P_B$ each having a cyclic period $T_0$ (a frequency $f_0$) are produced at three output terminals 10W, 10R and 10B of the circuit 10, respectively, as shown in FIGS.

3 $C_W$, $C_R$ and $C_B$. Since the arrangement of such gate signal generating circuit 10 which is adapted to produce the gate signals $p_W$, $P_R$ and $P_B$ with the aid of the pulse $P_0$ as described above is readily apparent to those skilled in the art, further detailed explanation thereof is omitted.

Thus produced gate signals $P_W$, $P_R$ and $P_B$ are in turn supplied to the gate circuits 7W, 7R and 7B respectively to control these gate circuits, so that video signals $E_W$ $(=E_R+E_G+E_B)$, $E-_RR$ $(=E_G+E_B)$ and $E-_B(=E_R+E_G)$ are available at the outputs of the gate circuits 7W, 7R and 7B for the terms $T_W$, $T_R$ and $T_B$ of each cyclic period $T_0$, respectively, as shown FIGS. 3 $D_W$, $D_R$ and $D_B$. Then, these video signals $E_W$, $E-_R$ and $E-_BE$ are supplied to the integrating circuits 8W, 8R and 8B, respectively. Here, it is to be noted that the time constant of each integrating circuit is selected to be substantially equal to or slightly longer than the cyclic period $T_0$ so that the integrating circuits 8W, 8R and 8B may hold signal levels substantially proportional to the output levels appearing in the terms $T_W$, $T_R$ and $T_B$ for a period of time substantially corresponding to the cyclic period $T_0$, respectively. Thus, noninterrupted or continuous video signals $E_W'$, $E-_R'$ and $E-_B'$ are obtained, as shown in FIGS. 3 $E_W$, $E_R$ and $E_B$. In this case, each of these video signals will be a lower band video signal having a band width smaller than the frequency $f_0$.

The video signals $E_W'$, $E-_R'$ and $E-_B'$ thus produced are supplied to a matrix circuit 11, so that three primary-color signals $E_R'$, $E_G'$ and $E_B'$ corresponding to the red, green and blue lights respectively are obtained at output terminals 11R, 11G and 11B of the matrix circuit 11, as illustrated in FIGS. 3 $F_R$, $F_G$ and $F_B$.

From the foregoing, it will be seen that the present invention makes it possible to produce color signals $E_R'$, $E_G'$ and $E_B'$ by means of a simplified arrangement using a single camera tube and a simple optical filter associated therewith. The signals related to the color lights R and B are successively interrupted at every period corresponding to the fundamental frequency $f_0$. Therefore, it may be thought that so-called Moire phenomenon will occur in the case of the scene of an object to be picked up which provides a frequency substantially equal to or in the neighborhood of the fundamental frequency $f_0$ for the color lights R and B to the video signal $E_C$. However, such phenomenon can be prevented by optically limiting the maximum frequency of the signals related to the color lights R and B below $f_0$. Ideally, this limitation is such that the cutoff frequency is selected to be lower than $f_0,0/2$.

Figure 4:
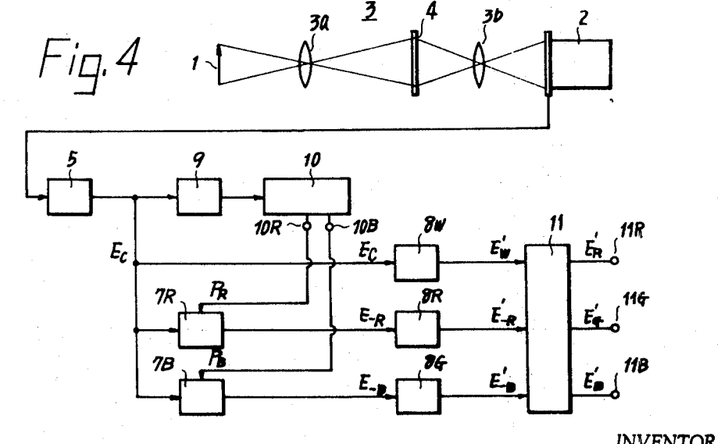
FIG. 4 is a schematic diagram of another basic example of the system according to this invention.

In the foregoing, description has been made of the case where the video signal $E_C$ is supplied in the manner of time-division to the integrating circuits 8W, 8R and 8B through the gate circuits 7W, 7R and 7B for the terms $T_W$, $T_R$ and $T_B$, respectively. However, the gate circuit 7W of FIG. 1 can be omitted as shown in FIG. 4. In this case, the components in all the terms of each cyclic period are integrated by the integrating circuit 8W, thus producing a video signal $E_W'$ having an amplitude corresponding to $(2E_R + 2E_B + 3E_G)$. In FIG. 4, parts corresponding to those of FIG. 1 are indicated by like reference numerals and characters, and detailed explanation thereof is omitted.

It has been found that through suitable selection of the constants of the matrix circuit 11 three color video signals $E_R'$, $E_G'$ and $E_B'$ similar to those described above with reference to FIG. 1 can be obtained. By processing the resultant color video signals $E_R'$, $E_G'$ and $E_B'$ in the following arrangement, it is possible to obtain such color video signals having a higher resolution.

Figure 5A:
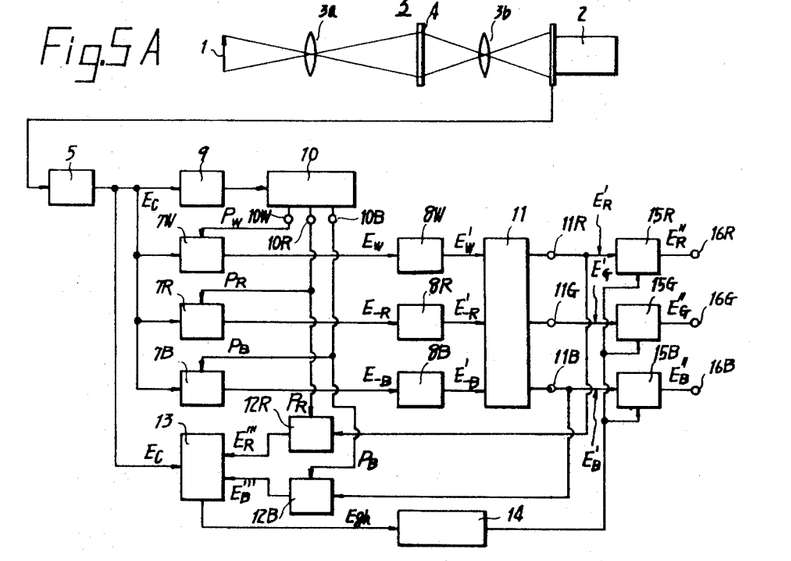
FIGS. 5A and B are schematic diagrams showing the systems of this invention based on the arrangements as shown in FIGS. 1 and 4, respectively.

FIG. 5A illustrates an embodiment of this invention based upon the arrangement of FIG. 1. In this figure, parts corresponding to those of FIG. 1 are indicated by like reference numerals and characters, and detailed explanation thereof will be omitted. With the arrangement of FIG. 5A, the color signals $E_R'$ and $E_B'$ obtained at the output terminals 11R and 11B are supplied to gate circuits 12R and 12B, respectively, which are controlled by the gate signals $P_R$ and $P_B$ as shown in FIGS. 3 $C_R$ and $C_B$ from the gate signal generating circuit 10.

In this way, a color signal $E_R'''$ appearing for the terms $T_W$ and $T_B$ except the term $T_R$ and a color signal appearing for the terms $T_W$ and $T_R$ except the term $T_B$ as shown in FIGS. $G_R$ and $G_B$ are supplied to a subtractor 13, and at the same time the color signal $E_C$ as described above in conjunction with FIG. 3A is also applied to the subtractor 13.

Due to the fact that the optical filter 4 is so designed as to enable a G (green) component to pass there through over the entire area thereof, it is possible to obtain throughout the entire terms a video signal Egh representing such a G component which is substantially free from limitation upon band width. Thus obtained video signal Egh as shown in FIG. 3H is supplied to mixer circuits 15R, 15G and 15B through a high pass filter 14, and simultaneously the video signals $E_R'E_G'$ and $E_B'$ are also applied to these mixer circuits from the output terminals 11R, 11G and 11B, respectively.

In this way, video signals $E_R''E_G''$ and $E_B''$ each containing a higher frequency component ranging above the fundamental frequency $f_0$ are obtained at output terminals 16R, 16G and 16B of the mixing circuits 15R, 15G and 15B, respectively. Each of these higher frequency components is a green component which has a great effect on resolution. Consequently, there can be obtained color video signals having a greatly improved resolution as compared with the video signals $E_R'E_G'$ and $E_B'$ which are obtained in the arrangement of FIG. 1.

A numerical example of the arrangement just described above is as follows: On the assumption that the effective screen of the photoelectric layer of the camera tube is 32mm. wide and 24mm. long, and that the ratio of the relay lens 3bto the screen is 1 : 1, the effective dimension of the optical filter 4 also becomes 32mm. in width and 24mm. in length. Further, assume that the extending direction of the strip filter elements crosses the electron beam scanning direction at a right angle with respect to the latter, that the transit time corresponding to one scanning line of the electron beam is 50$\mu$S, and that the fundamental frequency $f_0$ is 1 MC. Then the number of sets of strip filter elements 4W, 4R and 4B becomes 50, and the width of a set of such elements, that is, $D_0$ becomes 0.64mm. As a result, $D_W$, $D_R$ and $D_B$ becomes 0.213mm. in the case where they are equal to each other ($D_W=D_R=D_B$). In this case, T O = 10hu–6sec., and $T_W=T_R=T_B=$⅓ x 10hu –6sec.

Figure 6:
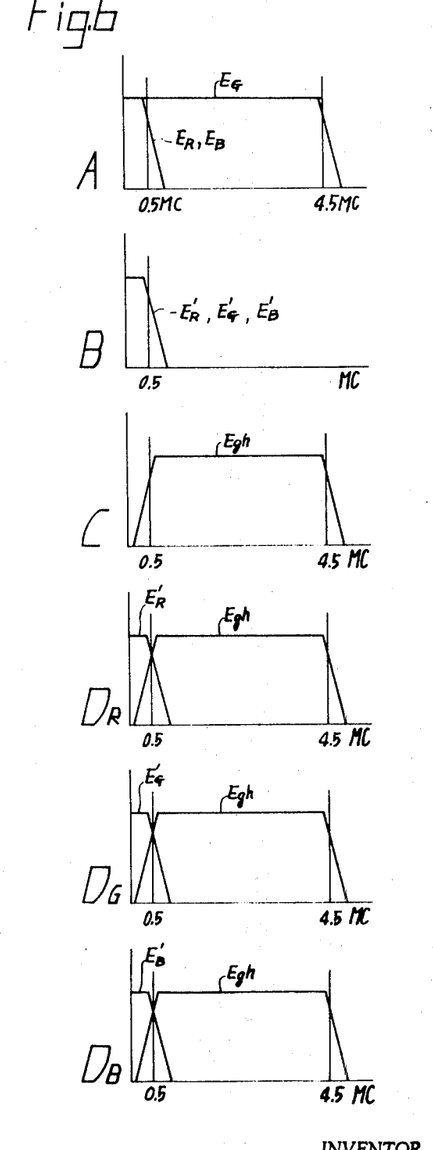
FIG. 6 is a frequency spectrum view for illustrating this invention.

With regard to the frequency spectra, the red, green and blue components $E_R$, $E_G$ and $E_B$ contained in the color video signal $E_C$ produced by the camera tube are as illustrated in FIG. 6A, if it is assumed that the maximum frequencies of the signals related to the color lights R and B are optically limited to 500 KC (0.5 MC) while the signal related to the color light G is not subjected to such limitation and therefore its frequency range extends up to 4.5 MC as is in the usual case. The frequency spectra of the color video signals $E_R'$, $E_G'$ and $E_B'$ obtained at the output terminals 11R, 11G and 11B of the matrix circuit 11 are as shown in FIG. 6B, on the assumption that they are limited to a band width narrower than 0.5 MC by the integrating circuits 8W, 8R and 8B.

Further, the green component Egh of a higher frequency appearing from the subtractor 13 through the high pass filter 14 will be as shown in FIG. 6C if the cutoff frequency of the high pass filter is selected to be approximately 0.5 MC. This will also be apparent from the green component $E_G$ as illustrated in FIG. 6A.

Consequently, each of the color video signals $E_R''$, $E_G''$ and $E_B''$ obtained at output terminals 16R, 16G and 16B of FIG. 5A extends over a frequency band including its higher frequency component, as shown in FIGS. 6 $D_R$, $D_G$ and $D_B$.

Although it may be considered that crosstalk will occur if the aperture of the camera tube through which an electron beam passes has a size that can not be neglected with respect to the pitch of the stripes in the image of a striped object, such crosstalk can be prevented through suitable adjustment of the time constants, for example, in the matrix circuit. It may also be considered that crosstalk will occur unless the band width of the transmission system for the video signal $E_C$ is of a sufficient value which is greater than several times the fundamental frequency $f_0$. However, it can also be prevented by suitably adjusting only the time constants. Of course, such adjustment of the time constants can be effected in gate circuits 12R and 12B and subtractor circuit 13.

Figure 5B:
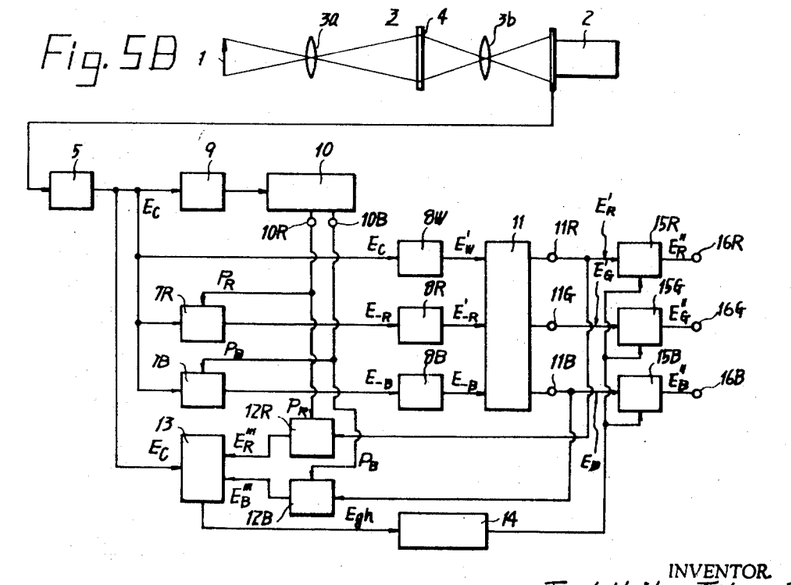

FIG. 5B is a view similar to FIG. 5A, showing another embodiment of this invention based on the arrangement of FIG. 4 for producing color video signals with an enhanced resolution. Since FIG. 5B demonstrates an arrangement similar to FIG. 5A, its parts corresponding to those in FIG. 5A are indicated by like reference numerals and characters and detailed explanation thereof is omitted.

Figure 7A:
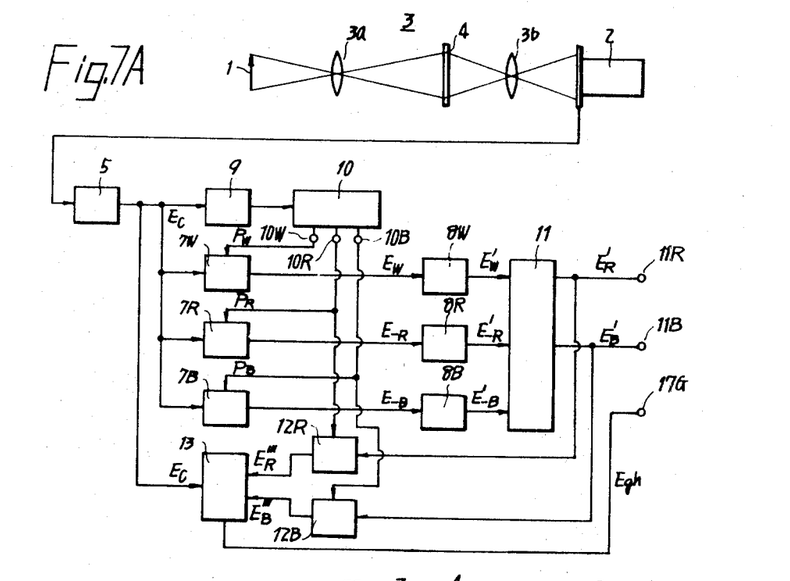
FIGS. 7A and B are schematic diagrams showing further embodiments of this invention, respectively.

Although, in the foregoing, description has been made of the case where an attempt is made to produce a color video signal with a high resolution with the aid of an arrangement based upon those of FIGS. 1 and 4, it is also possible to produce such a color video signal through use of an arrangement as shown in FIG. 7A, which constitutes another embodiment of this invention. In the FIG. 7A embodiment, the elements succeeding to the filter 14 in Fig. 5A are omitted, so that the video signal Egh from the subtractor 13 (this video signal contains its lower frequency component since it does not pass through the filter 14) is obtained at an output terminal 17G as a green color video signal and the other two color video signals $E_R'$ and $E_B'$ are obtained at output terminals 11R and 11B respectively. Although in this case no higher frequency components are added to the video signals $E_R'$ and $E_B'$, the resolution can still be greatly improved since the higher frequency component of the green signal can be substituted for the higher frequency component of luminance signal.

Figure 7B:
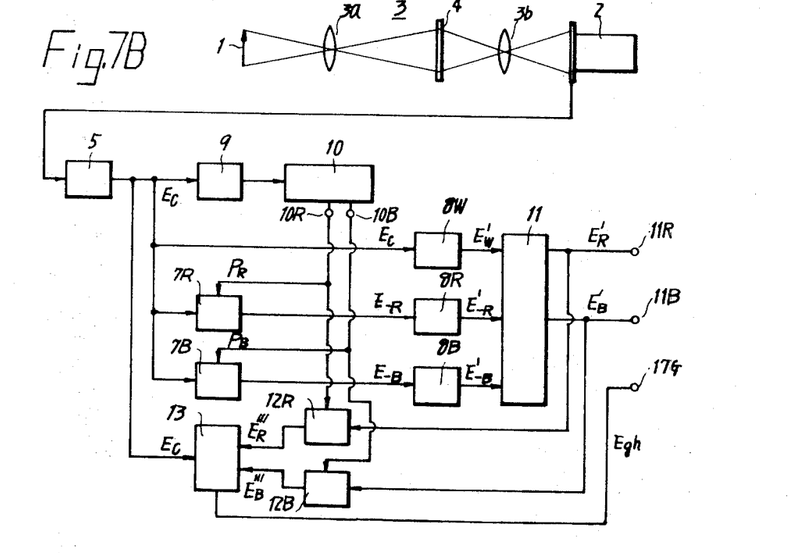

FIG. 7B shows an arrangement which is similar to that of FIG. 7A except that the gate circuit 7W of FIG. 7A is omitted as is the case with FIGS. 4 and 5B.

Figure 8:
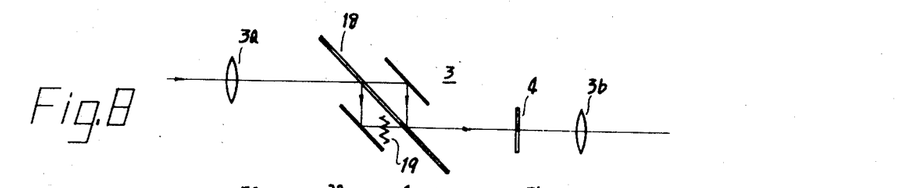
FIG. 8 is a schematic view showing an example of the optical system of this invention.
Figure 9A:
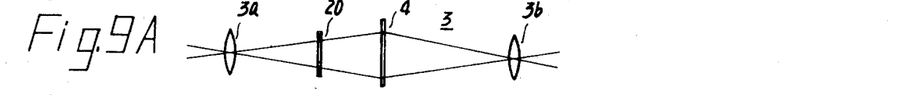
FIG. 9A is a schematic view similar to FIG. 8.
Figure 9B:
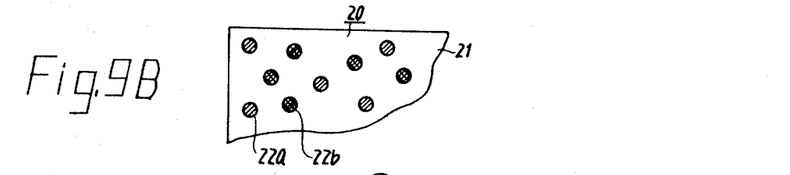
FIG. 9B is a view of an example of the optical filter applicable to the system of FIG. 9A.

In the foregoing, it has been stated that color lights R and B are limited so that the maximum frequencies of the output signals related to color lights R and B become lower than $f_0$ in view of the possibility that Moire phenomenon will occur with respect to the color lights R and B. As one concrete means for such purpose, the objective lens 3a may be constructed so that it represents a high resolution with respect to the green light G while with respect to each of the color lights R and B it represents a resolution which is decreased down to a predetermined value. As alternative means, use may be made of such an optical system as shown in FIG. 8 wherein the light path between the objective lens 3a and the optical filter 4 is divided into two light paths by means of a color separating filter 18 such as dichroic mirror which directs the green light G along one of the light paths and the color lights R and B along the other light path. For the purpose of limiting the resolution of the color lights R and B, an optical means 19 may be placed at the nonfocusing position of the objective lens in the light path for these color lights, and use may be made of a lenticular lens or roughened surface glass, for example, which is adapted to cause "blur". As a further means, use may be made of a filter 20 having a material such as multilayer film interference filter partially scattered therein which represents a remarkedly different refractive index with respect to the color lights R and B from that with respect to the other color light (color light G in this example). The filter 20 can be placed at a nonfocusing position between the objective lens 3a and the optical filter 4, as shown in FIG. 9A. FIG. 9B demonstrates an example of the filter 20 which is formed of a transparent base plate 21 such as glass plate having dotlike multilayer film filter elements 22a representing a different refractive index from that of the base plate with respect to only the color light R and dotlike multilayer film filter elements 22b representing a different refractive index from that of the base plate with respect to only the color light B scattered therein. In this case, the refractive indices of the both filter elements may be equal to or different from each other. In the case where they are equal to each other, use may be made of one kind of multilayer filter elements.

In the foregoing, description has been made of the case where pulses $P_O$ are produced by discriminating, for example, the term $T_W$ in terms of amplitude by means of the index signal generating circuit 9 in order to obtain gate signals to be supplied to the gate circuits for the color video signal $E_C$ produced by the camera tube 2. However, the optical filter 4 as shown in FIG. 2 may include, for example, black strip filter elements adapted for interrupting any light each of which is provided immediately before each filter element 4W along the electron beam scanning direction. Thus, it is also possible to obtain such pulses $P_O$ by discriminating the terms during which appear amplitude outputs corresponding to the black strip filter elements from other terms by means of the circuit 9. Furthermore, by decreasing the transmittivity of the strip filter elements capable of interrupting one color light with respect to the other color lights (in the above case, the blue light B for the elements 4R and the red light R for the elements 4B) than the color light (in the above case, the color light G) passing through the filter 4 over the entire area of the latter as compared with the transmittivity of the elements capable of passing therethrough all the color lights with respect to said other color lights so as to make the amplitudes of the output signals during the terms $T_W$ greater than those during the other terms, it is possible to more surely obtain the pulses $P_O$ by means of the circuit 9 even if the color light from the object is a single color light such as, for example, red light R (or blue light B).

Figure 10:
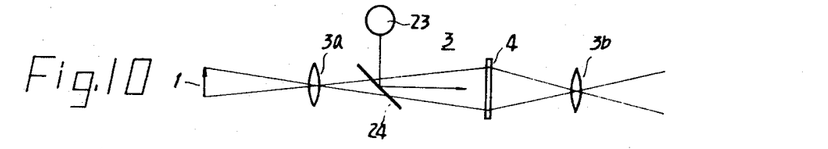
FIG. 10 is a schematic view similar to FIGS. 8 and 8A.
Figure 11:
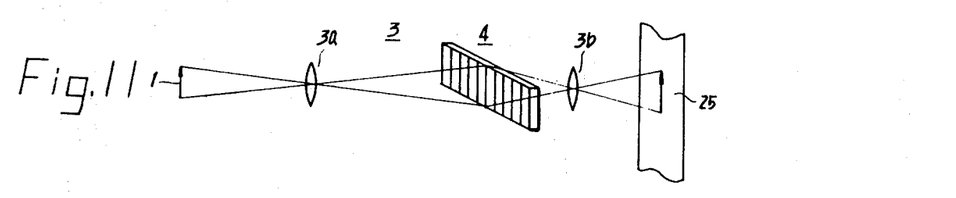
FIG. 11 is a schematic diagram showing a still further embodiment of this invention.

Furthermore, it is also possible that on the way of the optical path leading to the photoelectric conversion surface of the camera tube, a required color light different from the color lights from an object is directed from a light source 23 to the striped optical filter 4 through a translucent mirror 24, as illustrated in FIG. 10. In this way, the pulses $P_O$ can positively be obtained even if the luminosity of the object is too low. In the foregoing, description has been made of the case where the image of an object is projected onto the photoelectric conversion surface of the camera tube through the optical filter 4, while it is also possible to utilize the following method in order to achieve the same purpose. That is, as illustrated in FIG. 11, the image of an object is first projected onto a monochrome photographic film 25 comprising, for example, a light transmitting base with the aid of the aforementioned optical system and optical filter 4 and then the photographic film is developed. Thus the photographed film is optically picked up by means of a video camera tube or flying-spot scanning tube. In this way, a video signal $E_C$ similar to that as shown in FIG. 3 can be produced by the camera tube or flying-spot scanning tube, with the result that red, green and blue video signals are likewise produced, as will be apparent to those skilled in the art.

In the foregoing, description has been made of several embodiments of this invention each of which uses the optical filter 4 composed of the strip filter elements 4W passing therethrough all color lights, the strip filter elements 4R interrupting, for example, a red light and the strip filter elements 4B interrupting, for example, a blue light. In the arrangement as shown in FIG. 4, however, the optical filter 4 to be used therein may differ from the aforementioned one. That is, it may be composed of the strip filter elements 4W passing therethrough all color lights, the strip filter elements 4R passing therethrough, for example, a red light and the strip filter elements 4B passing therethrough, for example, a blue light.

As stated above, in the embodiments described above, the index pulses $P_O$ can positively be produced by making the amplitude during the terms $T_W$ greater than those during the other terms, even if the color light from an object is a monochromic light. Now, detailed description will be made of such a case. Assuming that in the optical filter as shown in FIG. 2, the transmittivities of each filter element 4W with respect to red, green and blue lights are $\alpha_{WR}$, $\alpha_{WG}$ and $\alpha_{WB}$ respectively, that those of each element 4R with respect to green and blue lights are $\alpha_{RG}$ and $\alpha_{RB}$ respectively, and that those of each element 4B with respect to red and green lights are $\alpha_{BR}$ and $\alpha_{BG}$ respectively, then the values of these transmittivities are selected so as to satisfy the following relations:

$$\alpha_{WR} > \alpha_{BR}$$
$$\alpha_{WB} > \alpha_{RB}$$
$$\alpha_{WG} > \alpha_{RG} \qquad \alpha_{WG} > \alpha_{BG}$$

Figure 12A:
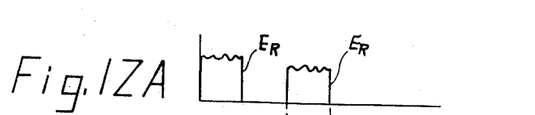
FIG. 12 is a waveform view for illustrating one aspect of this invention.
Figure 12B:
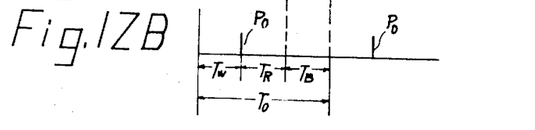

In this way, as shown in FIG. 12A, a color video signal $E_C$ possessing an output $E_R$ for the terms $T_W$ and $T_B$ can be produced from the camera tube in the case where the color light from an object is a red light only, for example. In this case, since the transmittivity $\alpha_{WR}$ of a red light for the term $T_W$ is higher than that $\alpha_{BR}$ for the term $T_B$, the amplitude of the video signal thus produced for the term $T_W$ is greater than that for the term $T_B$, resulting in positive discrimination between these two amplitudes. In the case where the light from the object is a green or blue light only, too, the amplitude of the output for the term $T_W$ is greater than that for the other term $T_R$ or $T_B$. Consequently, the output amplitude for the term $T_W$ always becomes greater than those for the other terms even if the color light from an object optionally changes in color, with the result that the index pulses can positively be produced, as shown in FIG. 12B.

The optical filter 4 adapted for the positive generation of index pulses $P_O$ is not restricted to such an arrangement as shown in FIG. 2. That is, in the case of this optical filter, the filter elements 4R may be adapted for passing therethrough, for example, red light only, and the filter elements 4B may be adapted for passing therethrough, for example, blue light only. Such an optical filter can be utilized in the systems as shown in FIGS. 1 and 4, but it cannot be applied to the systems as illustrated in FIGS. 5A and B and FIGS. 7A and B. This is because there is no color light that passes through all the strip filter elements so that a continuous color video signal with a wide frequency band width cannot be produced.

I claim:

1. A color video signal generating system, comprising a single one-gun video camera tube, an optical filter interposed in an optical path for said single one-gun video camera tube, said optical filter having an alternative successive arrangement of first strip filter elements passing therethrough substantially all color light, second strip filter elements interrupting substantially one of the color light and third strip filter elements interrupting substantially one color light which is different from the color light which said second strip filter elements interrupt, means for generating an index pulse, means for generating a gate pulse in response to said index pulse, each gate pulse having the cyclic period of said index pulse and having a width corresponding to the width of associated ones of said strip filter elements, a demodulator including at least two gate circuits and at least two integrating circuits and a matric circuit, said two gate circuits being controlled by said gate pulses respectively and gating said video signal, said two integrating circuits producing color video signals corresponding to the color lights passing associated ones of said strip filter elements, and said matrix circuit producing a plurality of primary-color video signals from said color video signals.

2. A color video signal generating system in accordance with claim 1, wherein signal generating means for a frequency higher than the frequency of said index pulses is provided, said higher frequency generating means including at least another two gate circuits and a subtractor, said two gate circuits of said higher frequency signal generating means being controlled by said gate pulses respectively and gating the two primary-color video signals, said subtractor producing a higher frequency signal corresponding to the color light which passes through the entire area of said optical filter from the outputs of said two gate circuits of said higher frequency signal generating means and said video signal of said single one-gun video camera tube.

3. A color video signal generating system as set forth in claim 1, wherein the transmittivity of the first strip filter elements of said optical filter with respect to the color lights which pass through said second and third strip filter elements are selected to be higher than those of said second and third strip filter elements with respect to said color lights so as to not cause dropout of said index pulse.

4. A color video signal generating system as set forth in claim 1, wherein a filter such as a multilayer interference filter having dioptric filter elements scattered therein is placed at a nonfocussing position in the optical light path for said single one-gun video camera tube, thereby reducing interference which occurs where the scene of the object is one which causes the video signal to have a fundamental frequency corresponding to the pitch of said optical filter or a frequency in the neighborhood of said fundamental frequency.

5. A color video signal generating system, comprising a single one-gun video camera tube, an optical filter interposed in an optical path for said single one-gun video camera tube, said optical filter having an alternative successive arrangement of first strip filter elements passing therethrough substantially all color light, second strip filter elements passing substantially one of the color light and third strip filter elements passing substantially one color light which is different from the color light which said second strip filter elements pass, means for generating an index pulse, means for generating a gate pulse in response to said index pulse, each gate pulse having the cyclic period of said index pulse and having a width corresponding to the width of associated ones of said strip filter elements, a demodulator including at least two gate circuits and at least two integrating circuits and a matrix circuit, said two gate circuits being controlled by said gate pulses respectively and gating said video signal, said two integrating circuits producing color video signals corresponding to the color lights passing associated ones of said strip filter elements, and said matrix circuit producing a plurality of primary-color video signals from said color video signals.

6. A color video signal generating system, comprising a single one-gun video camera tube, a photographed film or sheet disposed to be projected onto said single one-gun video camera tube, said photographed film or sheet being prepared by forming an image of an object to be picked up on a monochrome photographic film or sheet by photographic means with the aid of an optical filter and developing said monochrome photographic film or sheet, said optical filter having an alternative successive arrangement of first strip filter elements passing therethrough substantially all color light, second strip filter elements interrupting substantially one of the color light and third strip filter elements interrupting substantially one color light which is different from the color light which said second strip filter elements interrupt, means for generating an index pulse, means for generating a gate pulse in response to said index pulse, each gate pulse having the cyclic period of said index pulse and having a width corresponding to the width of associated ones of said strip filter elements, a demodulator including at least two gate circuits and at least two integrating circuits and a matrix circuit, said two gate circuits being controlled by said gate pulses respectively and gating said video signal, said two integrating circuits producing color video signals corresponding to the color lights passing associated ones of said strip filter elements, and said matrix circuit producing a plurality of primary-color video signals from said color video signals.

7. A color video signal generating system in accordance with claim 6, wherein signal generating means for a frequency higher than the frequency of said index pulses is provided, said higher frequency generating means including at least another two gate circuits and a subtractor, said two gate circuits of said higher frequency signal generating means being controlled by said gate pulses respectively and gating the two primary-color video signals, said subtractor producing a higher frequency signal corresponding to the color light which passes through the entire area of said optical filter from the outputs of said two gate circuits of said higher frequency signal generating means and said video signal of said single one-gun video camera tube.

8. A color video signal generating system as set forth in claim 6, wherein the transmittivity of the first strip filter elements of said optical filter with respect to the color lights which pass through said second and third strip filter elements are selected to be higher than those of said second and third strip filter elements with respect to said color lights so as to not cause dropout of said index pulse.

9. A color video signal generating system as set forth in claim 6, wherein a filter such as a multilayer interference filter having dioptric filter elements scattered therein is placed at a nonfocussing position in the optical light path for said monochrome photographic film or sheet thereby reducing interference which occurs where the scene of the object is one which causes the video signal to have a fundamental frequency corresponding to the pitch of said optical filter or a frequency in the neighborhood of said fundamental frequency.

10. A color video signal generating system, comprising a single one-gun video camera tube, a photographed film or sheet disposed to be projected onto said single one-gun video camera tube, said photographed film or sheet being prepared by forming an image of an object to be picked up on a monochrome photographic film or sheet by photographic means with the aid of an optical filter and developing said monochrome photographic film or sheet, said optical filter having an alternative successive arrangement of first strip filter elements passing therethrough substantially all color light, second strip filter elements passing substantially one of the color light and third strip filter elements passing substantially one color light which is different from the color light which said second strip filter elements passing, means for generating an index pulse, means for generating a gate pulse in response to said index pulse, each gate pulse having the cyclic period of said index pulse and having a width corresponding to the width of associated ones of said strip filter elements, a demodulator including at least two gate circuits and at least two integrating circuits and a matrix circuit, said two gate circuits being controlled by said gate pulses respectively and gating said video signal, said two integrating circuits producing color video signals corresponding to the color lights passing associated ones of said strip filter elements, and said matrix circuit producing a plurality of primary-color video signals.